Jan. 1, 1935.   R. I. HENDERSON   1,986,340
WELL TOOL
Filed April 12, 1934
Fig.1.  Fig.2.  Fig.3.
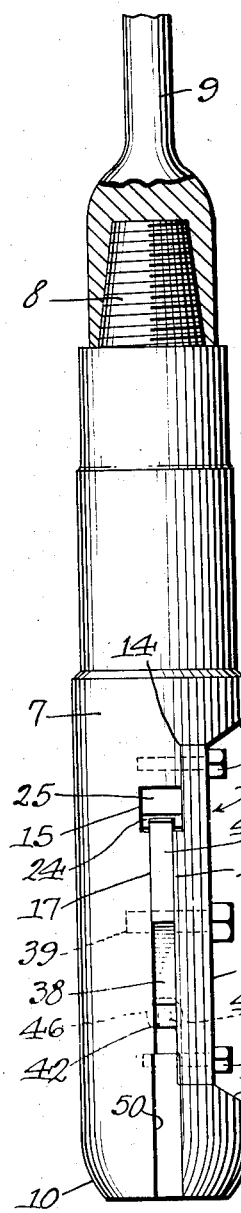
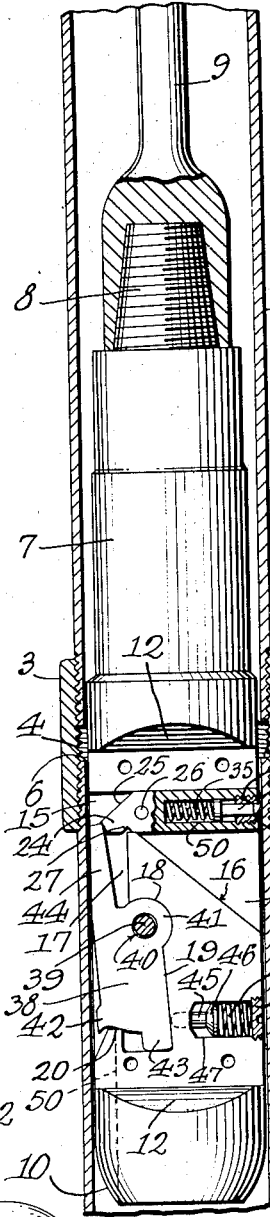
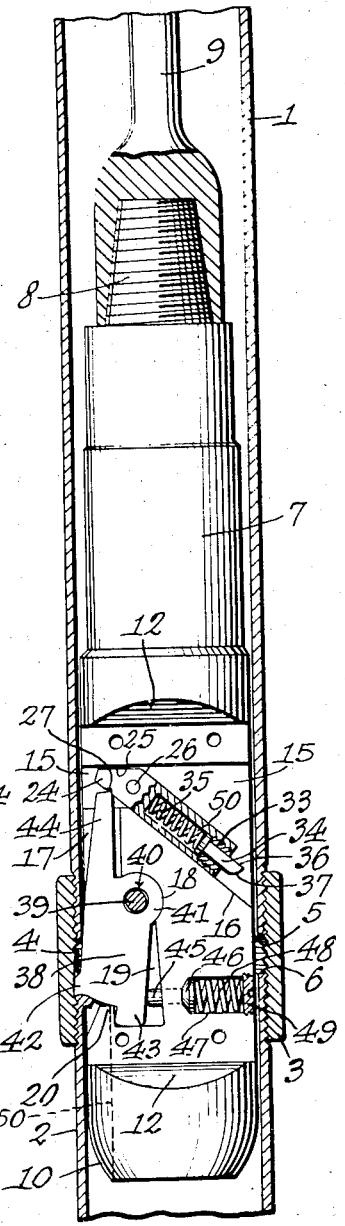
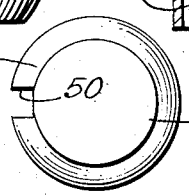
Fig.4.
Ralph I. Henderson Inventor
By C.A.Snow & Co.
Attorneys.

Patented Jan. 1, 1935

1,986,340

UNITED STATES PATENT OFFICE 1,986,340

WELL TOOL

Ralph I. Henderson, Charleston, W. Va.

Application April 12, 1934, Serial No. 720,311

4 Claims. (Cl. 81—188)

The device forming in subject matter of this application is a tool adapted to be used in the freeing of sections of well casing, from one or more casing sections that lie below. The invention aims to improve the cutter, to provide novel means for operating and controlling the movement of the cutter, and to supply novel means for housing and mounting the parts specified.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows, in side elevation, a device constructed in accordance with the invention, parts being in elevation;

Fig. 2 is a longitudinal section with parts in elevation, the view showing the tool as it will appear when the cutter is retracted;

Fig. 3 is a view similar to Fig. 2, but showing the cutter in a position which it will appear when the cutter is operative;

Fig. 4 is a bottom plan view of the device.

The numeral 1 marks the upper member of a well casing. The numeral 2 designates a lower member of the well casing. The casing sections 1 and 2 are connected by a threaded coupling 3. There is a space 4, within the coupling 3, between the ends of the casing sections 1 and 2. The lower end of the upper casing section 1 forms a shoulder 5 within the coupling 3. The upper end of the lower casing section 2 forms a shoulder 6 within the coupling 3.

The problem involved is to provide a means, actuated by downwardly-operating jars, for cutting away enough of the threads of the lower casing section 2 so that the hold of the coupling 3 on the lower casing section 2 may be weakened sufficiently so that the upper casing section 1 and sections above it (not shown) may be pulled out of the well.

A preferred form of tool for accomplishing the result outlined is shown in the drawing. It embodies a cylindrical body 7 which may be decreased in diameter by steps, toward its upper end. On its upper end, the body 7 has a projection 8, connected by threading or otherwise with the part 9 whereby the tool is lowered and raised. To facilitate the introduction of the body 7 into the casing, the body is tapered at its lower end, as shown at 10.

The body 7 is supplied with a side recess 11, the end walls of which are inclined, as shown at 12. The body 7 has a rebate 14 at the inner end of the side recess 11. A transverse chamber 15 is formed in the body 7 and communicates at one side with the rebate 14. The body 7 has an internal inclined surface 16, forming the lower wall of the chamber 15. In its outer edge, the body 7 is provided with a longitudinal slot 17. The slot 17 opens at its upper end into the upper part of the chamber 15. The slot 17 is narrower than the chamber 15. A rounded seat 18 is formed in the body 7 and opens into the slot 17. A chip-passage 50 extends from the lower end of the slot 17 downwardly through the lower end of the body 17 and opens outwardly through the side of the body. The slot 17 has a widened lower portion 19, below the seat 18. The body 7 is provided with an upwardly extended stop 20 at the bottom and at the lower portion of the part 19 of the slot 17. A cover plate 21 fits in the rebate 14. The cover plate 21 is held on the body 7 by securing elements 22. The heads of the securing elements 22 are located in the side recess 11. This prevents the heads of the securing elements 22 from catching on anything, as the tool is raised or lowered. The cover plate 21 has a thickened portion 23 forming the outer wall of the slot 17 in the body 7.

The numeral 24 designates a retainer. The retainer is located in the chamber 15. At one end, and on its upper edge, the retainer is beveled as shown at 25. The bevelling at 25 permits the retainer 24 to be swung from the position of Fig. 2 to the position of Fig. 3. A pivot element 26 connects the retainer 24 to the body 7, for swinging movement parallel to the axis of the body. There is a notch 27 in the lower edge of the retainer 24, below its bevelled end 25. The retainer 24 has a bore 50 in one end. A combined abutment and guide 33 is threaded into the retainer 24, at the outer end of the bore 50. A headed latch 34 slides in the guide 33. The latch 34 is pressed outwardly by a compression spring 35, located in the bore 50. The upper surface 36 of the latch 34 is parallel to the axis of the latch, the latch preferably being rectangular in cross section. At its outer end, the latch 34 is bevelled downwardly and inwardly, as shown at 37.

The numeral 38 marks a cutter extended lengthwise of the body 7. The cutter 38 is located in the longitudinal slot 17 of the body 7, and in the widened portion 19 of the slot. The cutter 38 is provided at its lower end with an outwardly and downwardly extended bit 42. On its rear edge, the cutter 38 is provided with a rounded extension 41. The extension 41 has a close fit in the seat 18 of the body 7. A pivot element 39 connects the cutter 38, intermediate its ends, with the body 7 and with the cover plate 21. The hole 40 in the cutter 38, which receives the pivot element 39, is of greater diameter than the pivot element. Therefore, when the cutter 38 is in the working position of Fig. 3, the extension 41 on the cutter 38 takes most of the strain off the pivot element 39. The cutter 38 is provided at its lower end with a foot 43. The foot 43 works back and forth in the lower part 19 of the slot 17, behind the stop 20. The cutter 38 is supplied at its upper end with a finger 44. The finger 44 cooperates with the retainer 24, in a way which will be explained hereinafter.

An actuator is provided, for swinging the cutter 38 from the inoperative position of Fig. 2 to the operative position of Fig. 3. This actuator may be a plunger 45 mounted to slide in the body 7, at right angles to the axis of the body and entering the part 19 of the slot 17. One end of the plunger 45 bears against the inner edge of the cutter 38, below the pivot element 39. The opposite end of the plunger 45 has an enlarged head 46. The head 46 is located in a transverse passage 47 in the body 7. The head 46 stops the forward movement of the plunger 45, under the action of a compression spring 48. The compression spring 48 is located in the passage 47, between the head 46 of the plunger 45 and an abutment 49, threaded into the body 7 at the outer end of the passage 47.

In practical operation, the cutter 38 is swung outwardly at its upper end, by hand, thereby retracting the bit 42 of the cutter. The retainer 34 is swung to a horizontal position and abuts against the body 7 at the top of the chamber 15. The spring 48 presses the plunger 45 inwardly against the lower end of the cutter 38. The finger 44 of the cutter 38 is pressed against the end of the retainer 24.

The device is lowered into the well tubing. The bevelled end 37 of the latch 34 rides over the shoulder 6 at the upper end of the lower tubing section 2, the spring 35 being compressed. The tool is raised from the position of Fig. 2 to the position of Fig. 3. Before the tool gets to the position of Fig. 3, the spring 35 pushes the latch 34 outwardly into the space 4 between the ends of the sections 1 and 2. The upper edge 36 of the latch 34 engages the shoulder 5 at the lower end of the upper casing section 1. This swings the outer end of the retainer 24 downwardly, and the inner end of the retainer is swung upwardly, out of engagement with the finger 44 of the cutter 38. The spring 48 and the plunger 45 swing the lower end of the cutter 38 outwardly, to dispose the cutter bit 42 above the lower end of the lower casing section 1. Under the impulse of the spring 48 and the plunger 45, the finger 44 of the cutter 38 swings inwardly to the position of Fig. 3. As the finger 44 rides along the lower edge of the retainer 24, the retainer is swung downwardly against the inclined surface 16 of the body 7. The upper extremity of the finger 44 is received in the notch 27 of the retainer 24. The engagement between the foot 43 of the cutter 38 and the stop 20 on the body 7 terminates the outward movement of the bit 42 and the inward movement of the finger 44.

By means of downwardly-operating jars (not shown) the tool is forced downwardly. The bit 42 of the cutter 38 slots down the upper end of the lower casing section 2 and cuts away a portion of the threads of the coupling 3, the material thus freed finding an exit through the chip-passage 50. The hold of the coupling 3 on the lower casing section 2 thus is weakened sufficiently so that the upper casing section 1 and parts above it can be separated from the lower section 2 and the upper section 1 and parts thereabove may be pulled out of the well.

Practically all tools of the class described work on the jar-up principle, such an operation resulting in complications so well-known to well drillers that they need not be enumerated here. The tool shown and described in this application is a simple jar-down structure, comprising few parts, and well adapted to stand the rough use to which it is necessarily subjected.

Having thus described the invention, what is claimed is:

1. A tool of the class described, comprising a body, a cutter extended longitudinally of the body and having a bit near its lower end, means for fulcruming the cutter intermediate its ends on the body, a retainer disposed transversely of the body and engageable at one end with the upper end of the cutter, to hold the lower end of the cutter and the bit retracted, means for fulcruming the retainer intermediate its ends on the body, a yieldably advanced latch movably mounted on the opposite end of the retainer and constituting casing engaging means for tilting the latch and releasing the cutter, and means for moving the lower end of the cutter and the bit outwardly, after the cutter has been released as aforesaid.

2. A tool of the class described, constructed as set forth in claim 1, and further characterized by the fact that the upper end of the cutter moves along the under edge of the retainer, at the first-specified end of the retainer, to swing the last-specified end of the retainer downwardly, when the cutter is moved outwardly at its lower end.

3. A device of the class described, constructed as set forth in claim 1, and wherein the means for moving the lower end of the cutter and the bit outwardly comprise a plunger slidable in the body and engaging the inner edge of the cutter, below the means for fulcruming the cutter, spring means for advancing the plunger, and an abutment on the body, for said spring means.

4. A device of the class described, constructed as set forth in claim 1, and wherein the means for fulcruming the cutter intermediate its ends comprises a seat in the body, an extension on the rear edge of the cutter and engaged in the seat, and a pivot element connecting the cutter with the body, the cutter having an opening for the reception of the pivot element, and the opening being of greater diameter than the pivot element, thereby throwing practically all of the strain on the extension and on the seat, when the cutter is in working position.

RALPH I. HENDERSON.